3,257,321
3,5-DIALKYL-4-HYDROXYBENZYL CHLORIDE
Joseph D. Odenweller, Birmingham, Mich., assignor to Ethyl Corporation, New York, N.Y., a corporation of Virginia
No Drawing. Filed Sept. 1, 1960, Ser. No. 53,363
8 Claims. (Cl. 252—54)

This invention relates to novel and useful chemical compounds and the preparation and uses thereof. Specifically, this invention relates to substituted-4-hydroxybenzyl chlorides, their preparation from 2,6-dialkyl phenols and their uses as antioxidants and intermediates.

An object of this invention is to provide novel and useful chemical compounds. Another object is to provide novel and useful substituted-4-hydroxybenzyl chloride compounds, which compounds are eminently useful in conducting novel chemical reactions. Another object is to provide processes of preparing the novel benzyl chlorides of this invention. A still further object is to provide improved compositions of matter containing the various compounds of this invention. A specific object is to provide lubricating oil stabilized against oxidative deterioration. A most important object of this invention is to provide intermediates in the preparation of other compounds, which compounds are eminently useful as antioxidants in a wide range of organic material. Other important objects of this invention will be apparent from the following description.

According to this invention the above and other objects are accomplished by providing, as a new composition of matter, a compound having the formula:

(I)
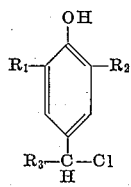

wherein $R_1$ is an alkyl radical having from 1 to 12 carbon atoms, $R_2$ is an alkyl radical having from 3 to 12 carbon atoms, and $R_3$ is selected from the group consisting of hydrogen, alkyl radicals having from 1 to 12 carbon atoms and mononuclear aryl radicals having from 6 to 12 carbon atoms.

The compounds of this invention are generally yellow to amber viscous liquids. They are insoluble in water, soluble in hydrocarbons, ashless and high boiling, thus facilitating their incorporation into a wide range of organic material. They are also, notably highly reactive chemical intermediates and open up a new field of chemical reactions involving the alpha position of the substituted-4-hydroxybenzyl radical, consequently leading to the formation of novel and eminently useful chemical compounds.

Examples of the compounds of this invention include 3 - n - propyl - 5 - n - octyl - 4 - hydroxybenzyl chloride, α - n - propyl - 3 - n - octyl - 5 - (2' - nonyl) - 4 - hydroxybenzyl chloride, 3,5 - diisopropyl - 4 - hydroxybenzyl chloride, α - p - hexyl - phenyl - 3 - amyl - 5-isopropyl - 4 - hydroxybenzyl chloride, 3,5 - di - tert-butyl - 4 - hydroxybenzyl chloride, α - amyl - 3 - ethyl-5 - (3' - hexyl) - 4 - hydroxybenzyl chloride, 3 - methyl-5 - tert - butyl - 4 - hydroxybenzyl chloride, α - n - heptyl-3 - n - butyl - 5 - n - dodecyl - 4 - hydroxybenzyl chloride, α - methyl - 3 - n - hexyl - 5 - n - dodecyl - 4 - hydroxybenzyl chloride, α - n - dodecyl - 3 - n - heptyl-5 - (4' - undecyl) - 4 - hydroxybenzyl chloride, α - n-butyl - 3 - n - nonyl - 4 - n - heptyl - 4 - hydroxy - benzyl chloride, and α - ethyl - 3 - methyl - 5 - sec - butyl - 4-hydroxybenzyl chloride.

A preferred embodiment of this invention consists of compounds of the above formula wherein $R_3$ is hydrogen. These compounds are preferred because of their ease of preparation from readily available starting materials. Among the compounds represented by this preferred embodiment are 3 - tert - butyl - 5 - methyl - 4-hydroxybenzyl chloride, 3 - n - undecyl - 5 - sec - butyl-4 - hydroxybenzyl chloride, 3 - methyl - 5 - n - octyl-4 - hydroxybenzyl chloride, 3,5 - di - tert - butyl - 4-hydroxybenzyl chloride, 3 - n - nonyl - 5 - ethyl - 4 - hydroxybenzyl chloride, 3 - n - heptyl - 5 - n - hexyl - 4-hydroxybenzyl chloride, 3,5 - diisopropyl - 4 - hydroxybenzyl chloride, 3 - n - propyl - 5 - n - decyl - 4 - hydroxybenzyl chloride, 3 - amyl - 5 - (4' - dodecyl) - 4-hydroxybenzyl chloride.

Another preferred embodiment of this invention consists of compounds of the above formula where $R_2$ is an alpha branched alkyl radical having from 4 to 8 carbon atoms, $R_1$ is an alkyl radical having from 1 to 4 carbon atoms and $R_3$ is hydrogen. These are particularly preferred because of their ease of preparation, their excellent antioxidant properties and, notably, their wide range of use as intermediates. Among the compounds represented by this preferred embodiment are 3-methyl-5-isopropyl - 4 - hydroxybenzyl chloride, 3,5 - di - tert-butyl - 4 - hydroxybenzyl chloride, 3 - n - butyl - 5-tert - butyl - 4 - hydroxybenzyl chloride, 3 - n - propyl-5 - (3' - octyl) - 4 - hydroxybenzyl chloride, 3,5 - diisopropyl - 4 - hydroxybenzyl chloride, 3 - methyl - 5-tert-butyl-4-hydroxybenzyl chloride.

The most particularly preferred compound of this invention is 3,5-di-tert-butyl - 4 - hydroxybenzyl chloride which is a most superior antioxidant in lubricating oil and other organic media and is most particularly suitable for use as an intermediate in the preparation of other excellent antioxidants, which antioxidants can be incorporated into a wide range of organic media.

In a non-limiting embodiment of this invention the compounds are prepared by reacting a compound having the formula:

(II)
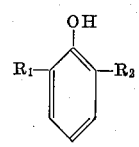

wherein $R_1$ and $R_2$ are as described following Formula I, with an aldehyde having from 1 to 13 carbon atoms, in the presence of, and reacting with, hydrogen chloride. The hydrogen chloride may be a gas and be bubbled through the reaction mixture or it may be in the form of concentrated hydrochloric acid and added to the reaction mixture or it may be both.

The solvents used in this reaction are any one of the mononuclear aromatic hydrocarbons having from 6 to 12 carbon atoms such as benzene, tulene, xylene, mestiylene and hexylbenzene; any one of the saturated hydrocarbons and their isomers having from 5 to 19 carbon atoms such as pentane, hexane, isooctane, dodecane, hexadecane and nonadecane; or the ethers such as ethyl ether and propyl ether; water; or the lower secondary and tertiary alcohols.

The temperatures employed in the reactions vary from about 20° C. to about 250° C., preferably from 20° C. to about 70° C., at reaction times of from one-half hour to one week or more to give a good yield of product.

Although excellent results are obtained throughout the temperature and time limits stated above, preferred reaction times are from 2 hours to about 12 hours. These reaction times give excellent results.

To obtain the elevated temperatures sometimes necessary in the reactions, pressure may be resorted to. However, with most reactants, atmospheric pressure is sufficient. Vacuum may be used when isolating the product such as distillation or when stripping the solvent. The product can be isolated by other means as well such as by extraction by organic solvents.

The following examples illustrate the compounds of this invention and their preparation according to the method outlined above.

*Example 1*

In a reaction vessel equipped with a stirrer and a sintered dispersion tube was placed 500 parts of 35 percent hydrochloric acid, 120 parts of para-formaldehyde and 206 parts of 2,6-di-tert-butyl phenol. Anhydrous hydrogen chloride gas was passed through the mixture by means of the dispersion tube for 7 hours. After standing at room temperature for about 15 hours the hydorgen chloride gas addition was continued for 2 hours. The mixture was separated into an organic phase and a water phase. Ether and benzene were added to the organic portion which was washed first with water, then with 2 percent sodium bicarbonate, again with water and then dried over sodium sulfate. After filtering, the solvents were distilled off under reduced pressure to give 245 parts (96.5 percent) of red viscous 3,5-di-tert-butyl-4-hydroxybenzyl chloride. Theoretical calculation for $C_{15}H_{23}OCl$ is: Carbon 70.8 percent, hydrogen 9.1 percent, chloride 19.92 percent. Chemical analysis found: Carbon 71.3 percent, hydrogen 9.3 percent, chlorine 13.8 percent. The compound, boiling at 118–121° C. under 1.0 mm. pressure, was found to have a refractive index of 1.52917 at 20.00° C. Infrared absorption analysis shows a tetra substitution at 11.35 microns, tertiary butyl compounds at 7.17 and 7.33 microns, a hydroxyl compound at 2.72 microns and a carbon chloride compound at 14.2 microns.

*Example 2*

A reaction vessel was equipped with heating means, a stirrer, thermometer and a sintered dispersion tube. A tank of anhydrous hydrogen chloride gas was connected to the dispersion tube through a bubbler. To this vessel were charged 250 parts of 35 percent hydrochloric acid, 60 parts of para-formaldehyde and 103 parts of 2,6-di-tert-butyl phenol. The temperature was raised to 50° C. and vigorous stirring was maintained for a period of 7 hours during which a total of approximately 150 additional parts of hydrogen chloride were fed into the reaction vessel. The product was extracted with ethyl ether, washed with water, then with 2 percent sodium bicarbonate and again water washed. It was then dried over calcium sulfate and filtered. This crude product was transferred to a vessel equipped with heating means, a heated Claison head and a fraction collector modified for vacuum distillation. The product was distilled at 116° to 120° C. under pressures ranging from 0.70 to 0.15 mm. Seventy-five parts of a viscous red-orange oil, 3,5-di-tert-butyl-4-hydroxybenzyl chloride, were obtained. Analytical comparison shows that this was the same product as obtained in Example 1.

*Example 3*

Four hundred parts of 35 percent hydrochloric acid, 190 parts of caproaldehyde and 280 parts of 2-isopropyl-6-tert-butyl phenol are mixed together in a reaction vessel equipped with a heating means, thermometer, water cooled condenser and stirrer. The temperature is raised to 60° C. and maintained at that temperature for 12 hours with stirring. The product is then extracted with propyl ether, washed with water, then with 5 percent sodium bicarbonate and again washed with water. After drying over sodium sulfide, distilling off the solvent, and filtering, α-amyl-3-isopropyl-5-tert-butyl-4-hydroxybenzyl chloride is obtained.

*Example 4*

Using the reaction vessel and equipment of Example 2, 100 parts of water, 200 parts of p-hexylbenzylaldehyde and 350 parts of 2-methyl-6-(3'-octyl)phenol are mixed together at 20° C. Hydrogen chloride gas is slowly bubbled through the reaction mixture with vigorous stirring for a period of one week. The product is then separated into an organic phase and water phase. Nonadecane is added to the organic portion which is then washed successively with water, 2 percent sodium bicarbonate and water again. After drying over sodium sulfate, distilling off the solvent, and filtering, α-p-hexylphenyl-3-methyl-5-(3'-octyl)-4-hydroxybenzyl chloride is obtained.

*Example 5*

Using the reaction vessel and equipment of Example 1, 200 parts of 2-ethyl-6-n-heptyl phenol, 110 parts of propionaldehyde and 400 parts of 35 percent hydrochloric acid are mixed together. Anhydrous hydrogen chloride gas is passed very slowly through this mixture for 2 hours at 70° C. The mixture is separated into an organic phase and a water phase and hexane added to the organic portion which is washed with water, then with dilute sodium bicarbonate, again with water and then dried over sodium sulfate. After filtering, the solvents are distilled off under reduced pressure to give α-ethyl-3-ethyl-5-n-heptyl-4-hydroxybenzyl chloride.

Proceeding in the manner of Example 5, good results are also obtained when other phenols are reacted with propionaldehyde or other aldehydes and hydrogen chloride. For example, 2-amyl-6-n-nonylphenol can be reacted with butyraldehyde and hydrochloric acid to form α - n - propyl - 3 - amyl - 5 - n - nonyl - 4 - hydroxybenzyl chloride. Likewise, 2-n-propyl-6-n-undecylphenol can be reacted with acetaldehyde and hydrochloric acid to yield α - methyl - 3 - n - propyl - 5 - n - undecyl - 4 - hydroxybenzyl chloride. Also 2-methyl-6-(2'-octyl)phenol can be reacted with valeraldehyde and hydrochloric acid to give α - n - butyl - 3 - methyl - 5 - (2' - octyl) - 4 - hydroxybenzyl chloride. A good example is the reaction of 2-methyl-6-(3'-dodecyl)phenol with paraformaldehyde and hydrochloric acid to give 3-methyl-6-(3'-dodecyl)-4-hydroxybenzyl chloride. Other examples of products that can be formed by this process will be apparent to one skilled in the art.

*Example 6*

An autoclave is equipped with heating means, an agitator and a temperature measuring device. The vessel is charged with 500 parts of 35 percent hydrochloric acid, 200 parts of 2,6-diisopropyl phenol, 120 parts of para-formaldehyde and sealed. The temperature of the reaction mass is raised to 250° C. with stirring, under its own pressure, and maintained at that temperature for one-half hour. The product is then extracted with hexylbenzene and washed with water, then with 5 percent sodium bicarbonate, again with water, dried over calcium sulfate and filtered. The solvent is then stripped using reduced pressure. The product is dried over calcium sulfate and filtered with suction to yield 3,5-diisopropyl-4-hydroxybenzyl chloride.

Proceeding in the manner of Example 6, good results are also obtained when other phenols are reacted in like manner with an aldehyde and hydrochloric acid. Thus, 2-methyl-6-tert-butyl phenol can be reacted with paraformaldehyde and hydrochloric acid to produce 3-methyl-5-tert-butyl-4-hydroxybenzyl chloride in good yield. Likewise, 2-n-butyl-6-(4'-octyl)phenol can be reacted with para-hexyl benzaldehyde to form α-p-hexylphenyl-3-n-butyl-5-(4'-octyl)-4-hydroxybenzyl chloride. Also, 2-methyl-6-n-dodecyl phenol can be reacted with 3'-ethyl-decaldehyde to produce α-(3'-ethyl decaldehyde)-3-methyl-5-n-dodecyl-4-hydroxybenzyl chloride. Other examples of products that can be formed by this process will be apparent to one skilled in the art.

The compounds of this invention are outstanding antioxidants. Therefore an embodiment of this invention is a new composition of matter which comprises organic material normally tending to undergo oxidative deterioration in the presence of air, oxygen, or ozone, containing an appropriate quantity, from 0.001 up to about 5 percent, and preferably from about 0.25 to about 2 percent, of a compound having the Formula I above.

The compounds of this invention find important utility as antioxidants in a wide variety of oxygen sensitive materials. Thus, liquid hydrocarbon fuels such as gasoline, kerosene and fuel oil are found to posses increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils, waxes, soaps and greases, plastics, synthetic polymers such as polyethylene and polypropylene, organometallic compositions such as tetraethyllead and tetraethyllead antiknock fluids, elastomers (including natural rubber), crankcase lubricating oils lubricating greases, and the like, greatly increase their resistance to deterioration in the presence of air, oxygen or ozone.

The compounds of this invention are very useful in protecting petroleum wax—paraffin wax and micro-crystalline wax—against oxidative deterioration. They also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus one embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

The compounds of this invention are also useful in preventing oxidative deterioration in lubricating oil compositions. Thus, a preferred embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of a compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperature.

The finished lubricants of this invention have much greater oxidation stability and many other improved performance characteristics as compared with the corresponding base oils. The following examples illustrate the preferred lubricating oil compositions of this invention.

*Example 7*

To show the useful properties of the novel compounds of this invention, recourse is had to the Polyveriform Oxidation Stability Test as described in the paper entitled "Factors Causing Lubricating Oil Deterioration in Engines" [Ind. and Eng. Chem., Anal. Ed. 17, 302 (1945)]. See also "A Bearing Corrosion Test for Lubricating Oils and Its Correlation With Engine Performance," [Al. Chem., 21, 737 (1949)]. This test effectively evaluates the performance of lubricating oil antioxidants. The test equipment procedure employed and correlations of the results with engine performance are discussed in the first paper cited above. By employing various compounds of this invention in oxygen-sensitive lubricating oil, effective inhibition of oxidative deterioration is achieved.

Comparatve tests were conducted using the method and apparatus essentially as described in the publication first mentioned above. One minor modification was that the steel sleeve and copper test piece described in this publication were omitted from the apparatus. In these tests an initially additive-free 95 V.I. solvent refined SAE–10 crankcase oil was used. The principal test conditions consisted of passing 70 liters of air per hour through the test oil for a total period of 20 hours while maintaining the oil at a temperature of 300° C. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of the oil employed.

Lubricating oils of this invention were prepared by blending 1 percent by weight of 3,5-di-tert-butyl-4-hydroxybenzyl chloride with the oil described above. These compositions were compared in the Polyveriform Test with a sample of the oil not containing the antioxidant. whereas during the test the oil containing no antioxidant increased in acid number to 4.6 and showed an increase in viscosity of 152 percent, the sample containing 3,5-di-tert-butyl-4-hydroxybenzyl chloride showed an acid number of only 1.0 and an increase in viscosity of only 42 percent thus showing an unusual improvement over the base oil.

*Example 8*

To 1,000 parts of a solvent refined neutral oil (95 V.I. and 200 SUS at 100° F.) containing 6 percent of a commercial methacrylate Type V.I. approver which gives the finished formulation of a V.I. of 140 and a viscosity of 300 SUS at 100° F. is added 5 percent of 3-methyl-tert-butyl-4-hydroxybenzyl chloride.

Example 9

To an additive-free solvent refined crankcase lubricating oil having a viscosity index of 95 and an SAE viscosity of 10 is added 0.001 percent of 3,5-diisopropyl-4-hydroxybenzyl chloride.

Example 10

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of α - n - dodecyl - 3 - methyl - 5 - n - octyl-4-hydroxybenzyl ing finished oil possesses markedly improved resistance against oxidative deterioration.

Example 11

To 100,000 parts of a commercially available pentaerythritol ester having a viscosity at 100° F. of 22.4 centistokes, and known in the trade as "Hercoflex 600" is added 400 parts (0.4 percent) of α-n-methyl-3-(2'-octyl)-5-dodecyl-4-hydroxybenzyl chloride. The resulting finished oil possesses markedly improved resistance against oxidative deterioration.

Example 12

To 100,000 parts of dioctyl sebacate having a viscosity of 210° F. of 36.7 SUS, a viscosity index of 159 and a molecular weight of 426.7 is added 250 parts (0.25 percent) of α-p-hexyl phenyl-3-(3'-dodecyl)-5-methyl-4-hydroxybenzyl chloride.

The compounds of this invention are also useful as additives to functional fluids and automatic transmission fluids. The primary constituent of a functional fluid is a refined mineral lubricating oil having carefully selected minimum viscosity of 49 Saybolt Universal seconds SUS at 210° F. and a maximum viscosity of 7,000 SUS at 0° F., generally a distillate oil, lighter than an SAE-10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together while heating the oil to a temperature up to 200° F.

Example 13

A fluid of this invention is prepared by blending 80 parts of a conventionally-refined Pennsylvania mineral oil (99 SUS at 100° F.), 2 parts of 3-methyl-5-n-dodecyl-4-hydroxybenzyl chloride, 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity at 60/60° F. of 0.919.

Example 14

Another such fluid consists of 95 parts of a solvent-refined, light acid-treated clay-contacted, solvent dewaxed paraffin base distillate mineral oil (110 SUS at 100° F.), 0.1 part of 3-ethyl-5-(2'-heptyl)-4-hydroxybenzyl chloride, 0.1 part of calcium octyl phenol sulfide, 2 parts of a sulfurized sperm oil having a sulfur content between 10–12 percent, a viscosity at 210° F. of 200 SUS and a pour point of 65° F., 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity at 60/60° F. of 0.875.

Liquid hydrocarbon fuels employed in the operation of spark ignition combustion engines are also vastly improved in their storage stability by the practice of this invention. The following examples illustrate compositions of typical commercial gasolines which may be stabilized against oxidative deterioration by the inclusion therein of a compound of this invention.

Example 15

To 1,000 parts of a gasoline containing 26.6 percent aromatics, 20.8 percent olefins, 52.6 percent saturates, and an API gravity of 62.1° is added 10 parts of 3-methyl-5-tert-butyl-4-hydroxybenzyl chloride.

Example 16

To 10,000 parts of a gasoline containing 8.6 percent aromatics, 7.9 percent olefins, 83.5 percent saturates and an API gravity of 68.5° is added 500 parts of 3,5-di-tert-butyl-4-hydroxybenzyl chloride.

As noted in the preceding examples, the compounds of this invention are excellent antioxidants. This ability to prevent oxidation and deterioration of organic media is completely unexpected since seemingly similar compounds show little or no such antioxidant activity.

The compounds of this invention are extremely useful as intermediates in the preparation of many heretofore unavailable new compounds. This great utility can be attributed to the ability of these compounds to be readily substituted on the alpha position of the substituted hydroxybenzyl group. Substitution reactions involving the removal of the chlorine atom facilitates the synthesis of highly desirable ortho-substituted phenolic and diphenolic compounds which themselves are excellent antioxidants and, notably, find utility in a wide range of organic media.

In one demonstration of the utility of the compounds of this invention as intermediates, they can be used in the preparation of the polysulfur ethers of alpha and ortho-substituted paracresols. This is accomplished by reacting the compounds of this invention with sodium polysulfide, the number of sulfur atoms per sodium atoms depending on the number of sulfurs desired on the product. Thus, with one of the compounds of this invention, the following reaction can occur:

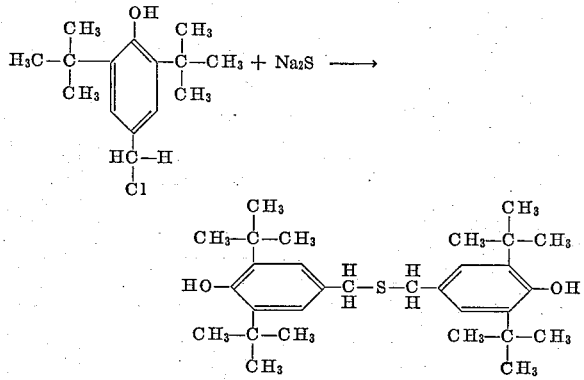

The above reaction is illustrated by the following examples:

*Example 17*

A mixture of 19.2 parts of sodium sulfide dissolved in 15 parts of water, 120 parts of isopropyl alcohol, and 50 parts of 3,5-di-tert-butyl-4-hydroxybenzyl chloride was refluxed for 2 hours in a reaction vessel equipped with a heating means, thermometer, water cooled condenser and means for stirring. After standing for 2 days at room temperature the solids were collected by filtration, washed with water and dried. They were then recrystallized from isooctane and methanol to give α,α'-thiobis(2,6-di-tert-butyl-p-cresol), a crystalline solid with a melting point of 141–143° C. Infrared absorption analysis supports the structure of α,α'thiobis(2,6-di-tert-butyl-p-cresol), showing hindered phenol groups at 2.71 microns, tertiary butyl groups at 7.16 and 7.33 microns and a tetrasubstituted benzene ring at 11.32 microns. The calculated percent sulfur for $C_{30}H_{46}O_2S$ is 6.81 percent. Chemical analysis: Found: 6.87 percent of sulfur.

Proceeding in the manner of Example 15, good results are also obtained when other benzyl chlorides are reacted with the sodium salt of sulfur. For example, 3-methyl-5-tert-butyl-4-hydroxybenzyl chloride can be reacted with $Na_2S_2$ to form α,α'-dithiobis(2-methyl-6-tert-butyl-p-cresol). Likewise, α-n-heptyl-3-n-propyl-5-(3'-dodecyl)-4-hydroxybenzyl chloride can be reacted with $Na_2S_3$ to give $α^4$, $α^{4'}$-trithiobis[2-n-propyl-6-(3'-dodecyl)-4-n-octyl phenol]. Also α-n-butyl-3-methyl-5-(2'-octyl)-4-hydroxybenzyl chloride can be reacted with $Na_2S_4$ to yield $α^4$,$α^{4'}$-tetrathiobis[2-methyl-6-(2'-octyl)-4-amyl phenol].

In a further demonstration of the utility of the compounds of this invention as intermediates, they can be used in the preparation of the dialkyl(α-substituted-3,5-di-substituted-4-hydroxybenzyl phosphonates. This is accomplished by reacting the compounds of this invention with trialkyl phosphite. Thus, with one of the compounds of this invention the following reaction can occur.

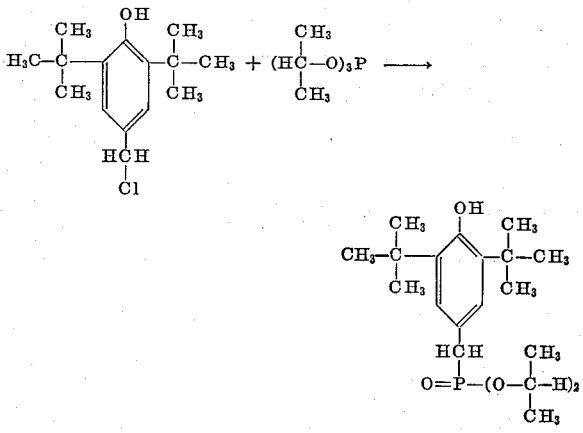

The above reaction can be illustrated by the following examples:

*Example 18*

In a reaction vessel equipped with a condenser, stirrer and means of heating, 10.0 parts of 3,5-di-tert-butyl-4-hydroxybenzyl chloride and 11.2 parts of triisopropyl phosphite in 50 parts of benzene were refluxed for 3 hours. After cooling reduced pressure was applied and the temperature raised to remove the solvent. The residue was then allowed to crystallize (one hour). The solid was triturated with petroleum ether (65–110° C.), cooled and filtered to yield 9.5 parts (56–62 percent) of crystalline diisopropyl(3,5-di-tert-butyl-4-hydroxybenzyl) phosphonate melting at 100–101° C. Recrystallization from petroleum ether 65–110° C. afforded a pure compound with a melting point of 104–105° C. Theoretical calculation for $C_{19}H_{33}PO_4$ gives a percent carbon of 63.7 and a percent hydrogen of 9.8. Chemical analysis found a percent carbon of 63.9 and a percent of hydrogen of 10.1.

Proceeding in the manner of Example 16, good results are also obtained when other benzyl chlorides are reacted with trialkyl phosphites. For example, α-p-hexyl phenyl - 3 - n-butyl-5-(4'-octyl)-4-hydroxybenzyl chloride can be reacted with trimethyl phosphite to form dimethyl-[α - p - hexyl phenyl - 3 - n - butyl-5-(4'-octyl)-4-hydroxybenzyl] phosphonate. Likewise, α-methyl-5-tert-butyl-4-hydroxybenzyl chloride can be reacted with triethyl phosphite to yield di-ethyl(α-ethyl-3-methyl-5-tert-butyl-4- hydroxybenzyl) phosphonate. Also, 3,5-diisopropyl-4-hydroxybenzyl chloride can be reacted with tri-n-hexyl phosphite to give di-n-hexyl(3,5-diisopropyl-4-hydroxybenzyl) phosphonate.

The phosphorus and sulfur-containing compounds prepared from the compounds of this invention are outstanding antioxidants in lubricating oil. To illustrate this property a standard oil oxidation test is used. The equipment and test procedure described by Kroger et al., Erdol and Kohle, 2, page 398 (1949), served as a basis for the test. The equipment and procedures are slightly modified in order to make the oxidizing conditions more strenuous. In this manner the test lubricants are subjected to severe oxidizing conditions, in order to conclusively establish the effectiveness of additives under very adverse conditions. Furthermore, the modifications are found to provide results which correlate extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake. In all cases the test oil is deliberately contaminated with iron hexoate as an oxidation promoter. In tests of this nature, the oxidation stability of a test lubricant is determined by measuring its induction period, that is, the time required for catastrophic deterioration under the above outlined conditions. The longer the induction period, the more stable the lubricant. In this test, at 150° C., base oils alone had induction times of from 3–22 minutes while the base oils containing $2 \times 10^{-4}$ moles per liter of dimethyl(3,5-di-tert-butyl-4-hydroxybenzyl phosphonate and base oils containing $1.0 \times 10^{-2}$ moles per liter of α,α'-thiobis(2,6-di-tert-butyl-p-cresol) had induction times, respectively, of 119 and 129 minutes, thus showing unusual improvement over the base oil.

I claim:
1. A compound having the formula:

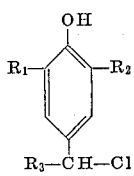

wherein $R_1$ is an alkyl radical having from 1 to 12 carbon atoms, $R_2$ is an alkyl radical having from 3 to 12 carbon atoms and $R_3$ is selected from the group consisting of hydrogen, alkyl radicals having from 1 to 12 carbon atoms and mononuclear aryl radicals having from 6 to 12 carbon atoms.

2. The compound of claim 1 wherein $R_3$ is hydrogen.
3. The compound of claim 2 wherein $R_1$ is an alkyl radical having from 1 to 4 carbon atoms and $R_2$ is an α-branched alkyl radical having from 4 to 8 carbon atoms.
4. 3,5-di-tert-butyl-4-hydroxybenzyl chloride.
5. Organic material normally tending to undergo oxidative deterioration in the presence of air, oxygen or ozone containing a small antioxidant quantity, up to 5 percent, of the compound of claim 1.
6. The composition of claim 5 wherein said organic material is a lubricating oil.
7. The composition of claim 6 wherein said compound is 3,5-di-tert-butyl-4-hydroxybenzyl chloride.
8. Organic material normally subject to oxidative deterioration containing a stabilizing amount of 3,5-dialkyl-4-hydroxybenzyl chloride, the alkyl groups having from 3 to 8 carbon atoms and at least one of said alkyl groups being branched on the alpha carbon atom.

References Cited by the Examiner

UNITED STATES PATENTS

| | | | |
|---|---|---|---|
| 1,807,729 | 6/1931 | Brunner | 260—623 |
| 2,165,956 | 7/1939 | Brunner | 260—623 |
| 2,318,013 | 5/1943 | Prutton et al. | 252—54 |
| 2,469,469 | 5/1949 | Kluge et al. | 252—54 |
| 2,618,645 | 11/1952 | Bowles | 260—623 |
| 2,831,898 | 4/1958 | Ecke et al. | 260—623 X |
| 2,837,576 | 6/1958 | Kundiger et al. | 260—623 |

OTHER REFERENCES

Bohn et al.: Jour. Organic Chem., vol. 22 (1957), pages 458–60 (3 pages).

DANIEL E. WYMAN, *Primary Examiner.*

JULIUS GREENWALD, CHARLES B. PARKER, ALPHONSO D. SULLIVAN, *Examiners.*

G. O. ENOCKSON, H. G. MOORE, P. C. BAKER, P. P. GARVIN, *Assistant Examiners.*